UNITED STATES PATENT OFFICE.

WILLIAM GRISCOM, JR., OF BOUND BROOK, NEW JERSEY, ASSIGNOR TO THE STANDARD PAINT COMPANY, OF NEW YORK, N. Y.

VULCANIZABLE COMPOUND.

SPECIFICATION forming part of Letters Patent No. 529,727, dated November 27, 1894.

Application filed March 11, 1891. Serial No. 384,643. (No specimens.)

*To all whom it may concern:*

Be it known that I, WILLIAM GRISCOM, Jr., of Bound Brook, in the county of Somerset and State of New Jersey, have invented a new and useful Vulcanizable Compound; and I do hereby declare that the following specification is a clear, true, and complete description of my invention.

My said invention, is based upon my discovery of the fact, that the residual products from the distillation of animal fats, oils, &c., can be combined with sulphur, and then developed into a vulcanized mass, possessing some of the elastic, and other desirable characteristics, of vulcanized caoutchouc, or rubber compounds, but differing therefrom, in the matter of tensile strength, and promptness in resiliency. My said vulcanized compound, is comparatively weak, and slow in resiliency, but nevertheless, it possesses much practical value, for such uses as electric insulation, and water proofing, and especially after it has been reduced to a liquefied form, by the aid of a suitable solvent. The residual products referred to, may be embraced within the meaning of the well known term "candle tar," although said products vary quite widely in their character, according to the mode of distillation involved in their production. In some cases, animal fat candle tar is quite soft, and ropy, and especially when resulting from steam distillation, and without the use of acids, or alkalies, and it is from the use of that particular form of animal fat candle tar, that the best results will accrue. In other cases, the animal fat candle tar is quite solid, and hard, and there are many intermediate grades, and all of them can be used with more or less satisfactory results, but, as a rule, in using the hard forms, they should first be rendered comparatively soft, either by compounding them with the specially soft forms, or with the last or heavy distillate, which is evolved from the still, next prior to a delivery of the residual product. As distinguished from such residuum pitches, as are obtained from the distillation of vegetable oils, the animal fat candle tar possesses peculiar and specially valuable capacities, for practically resisting the destructive action of acids and alkalies, as well as resisting deterioration by oxidation, as when long exposed in the open air, to light, heat and frequent wetting and drying.

In the production of my novel compound, the procedure will be varied, according to the uses to which it is to be applied. For producing it in bulk, I heat the animal fat candle tar sufficiently, to develop by melting, a high degree of liquefaction. In the meantime I heat the sulphur to a completely melted and well liquefied condition, and then mix the two elements intimately while slowly raising the temperature of the mass, to about 300° to 325° Fahrenheit. After so maintaining it, for say from thirty minutes to an hour, it is allowed to cool. The resultant mass will be sometimes more or less honeycombed in appearance, but the main portion thereof, will be quite solid, and if when still quite hot, it be transferred to a mold, or cylinder, and subjected to piston pressure, it will cool into a comparatively solid elastic mass.

The proportion of sulphur, to the candle tar, may be quite widely varied, but I have secured the best results, by the use of from one to three ounces of sulphur, to each sixteen ounces of the candle tar, but the variable character of the latter, renders it necessary to make preliminary tests of proportions in small quantities, for securing its satisfactory production in mass.

For use in the manufacture of paint, the vulcanized compound will be in its most desirable form, when well honeycombed, or cellular because of the greater facility with which the solvents may attack it, and although some of the lightest volatile hydrocarbons, will serve as solvents, the most desirable solvent known to me is the light oil from coal tar, not only because of its comparatively low cost, but it is a thorough solvent, quite prompt in its action, readily maintains the vulcanized matter in solution, and serves as a thoroughly practical vehicle, for working the compound as a paint, and such a paint compound, will be made the subject of a separate application for Letters Patent. See Serial No. 384,648, filed March 11, 1891. When the vulcanized compound is to be applied to a sheeted foundation, such as cloth, the latter should be passed through the heated and still liquefied vulcanized compounds, then promptly stripped of all that can be well removed, and then with its surfaces thoroughly dusted, the charged fabric is slowly passed between compressing rolls, care being taken to prevent adhesion of the compound thereto. On finally hardening, such fabric will be flexible, and elastic within the normal limits of the uncharged cloth, and rendered as durably waterproof as if rubber compounds had been employed, and, as I believe, such fabrics are less liable to deterioration under ordinary exposures to temperature, air, moisture and water. In like manner, electric wires which have been first coated or jacketed with a braided or a woven fabric, may be passed through the heated mass of compound, then thoroughly stripped, dusted, and rubbed, and thereby developed into a grade of insulated wire which is quite equal to such as embody vulcanized rubber compounds; and my insulated wire can be produced at a cost far below that involved in the use of the comparatively expensive rubber. This method of compounding, and applying an elastic vulcanizable compound to textile materials, and some of the resulting products, constitute other portions of my invention which will be made the subjects of separate applications for Letters Patent. See Serial No. 384,645, filed March 11, 1891, and Serial Nos. 384,824 and 384,826, filed March 12, 1891.

My preferred method of producing my vulcanized compound differs from all prior methods, in that instead of combining sulphur in its normal condition with the matter to be vulcanized, and then subjecting the mass to heat, I highly heat the matter, melt the sulphur, combine them, and further expose to heat, and for the first time, in the charging or coating of textile material with a vulcanizable compound, I unite the whole after the compound has really been vulcanized, instead of as heretofore applying vulcanizable gum compound to textile material, and then vulcanizing the compound. It is however to be understood that I am aware that soft animal fat candle tar, and powdered sulphur, may be well triturated under a temperature far below the melting point of sulphur, and then applied to a foundation fabric, and the whole then exposed to vulcanizing temperature, and the vulcanized compound so produced is intended to be within the meaning of my present application, and therefore a vulcanizable, or vulcanized, compound of animal fat candle tar and sulphur, constitutes the main feature of my invention, in that it is a vulcanizable compound whether developed at once, and in bulk, into a vulcanized compound, or in such form that it may be first applied to a foundation fabric, and then developed into a vulcanized compound. My compound of sulphur, and animal fat candle tar, both prior to, and after vulcanization, may be employed to good advantage, in compounds containing rubber, and the metallic salts, and such earthy bodies as are usually compounded therewith, and especially in such connections as demand greater economy, than would result from the use of rubber as the sole elastic medium.

Certain specially desirable results, accrue from the use of the sulphur, and animal fat candle tar, with normally hard, but plastic bodies, of which the residual products from petroleum distillation, constitute the best type, and such compounds will be made the subject of a separate application for Letters Patent. (See Serial No. 384,644, filed March 11, 1891.)

Having thus described my invention, I claim under Letters Patent appropriate to this application—

1. A vulcanizable compound composed of animal fat candle tar and sulphur, substantially as described.

2. An elastic compound consisting of animal fat candle tar and sulphur hardened by vulcanization substantially as described.

WILLIAM GRISCOM, JR.

Witnesses:
PHILIP F. LARNER,
HOWELL BARTLE.